(12) United States Patent
Balakrishnan et al.

(10) Patent No.: US 12,441,388 B2
(45) Date of Patent: Oct. 14, 2025

(54) STEER BY WIRE SYSTEM FOR OPERATING STEERING WHEEL AND STEERING COLUMN

(71) Applicants: Robert Bosch GmbH, Stuttgart (DE); Bosch Global Software Technologies Private Limited, Bangalore (IN)

(72) Inventors: Karthik Balakrishnan, Coimbatore (IN); Selvaraj Sharath Kumar, Chennai (IN)

(73) Assignees: Robert Bosch GmbH, Stuttgart (DE); Bosch Global Software Technologies Private Limited, Bangalore (IN)

( * ) Notice: Subject to any disclaimer, the term of this patent is extended or adjusted under 35 U.S.C. 154(b) by 202 days.

(21) Appl. No.: 18/324,958

(22) Filed: May 27, 2023

(65) Prior Publication Data
US 2023/0382448 A1 Nov. 30, 2023

(30) Foreign Application Priority Data

May 31, 2022 (IN) .......................... 2022 4103 1009

(51) Int. Cl.
| | |
|---|---|
| *B62D 1/187* | (2006.01) |
| *B62D 1/181* | (2006.01) |
| *B62D 5/00* | (2006.01) |
| *H02P 5/68* | (2006.01) |
| *H02P 7/03* | (2016.01) |

(52) U.S. Cl.
CPC ............. *B62D 1/187* (2013.01); *B62D 1/181* (2013.01); *B62D 5/001* (2013.01); *H02P 5/68* (2013.01); *H02P 7/04* (2016.02)

(58) Field of Classification Search
CPC ........ B62D 1/187; B62D 1/181; B62D 5/001; B62D 5/0406; B62D 5/046; B62D 5/006; H02P 5/68; H02P 7/04; H02P 5/74
USPC .................. 318/400.29, 400.26, 400.01, 700
See application file for complete search history.

(56) References Cited

U.S. PATENT DOCUMENTS

| | | | |
|---|---|---|---|
| 6,856,106 B2* | 2/2005 | Bliley ....................... | H02P 5/68 318/41 |
| 7,782,006 B2* | 8/2010 | Misumi ................... | H02P 27/08 318/696 |
| 8,963,473 B2* | 2/2015 | Lauwaert .................. | H02P 8/34 318/560 |

(Continued)

FOREIGN PATENT DOCUMENTS

DE 10 2017 217 581 A1 4/2019

*Primary Examiner* — David Luo
(74) *Attorney, Agent, or Firm* — Maginot, Moore & Beck LLP

(57) ABSTRACT

A steer by wire system includes at least a steering wheel actuator for operating steering wheel and steering column. The steering wheel actuates the steering wheel actuator by way of a brushless DC motor. The steering wheel actuator adjusts the steering column in a tilt direction by way of a first brushed DC motor and in a telescopic direction by way of a second brushed DC motor. The first brushed DC motor and the second brushed DC motor are configured to operate via two separate H bridges having a shared arm of switches. The brushless DC motor is configured to operate with two three-phase H bridges of which one three-phase H bridge is the network of switches of the first brushed DC motor and the second brushed DC motor.

4 Claims, 3 Drawing Sheets

(56) References Cited

U.S. PATENT DOCUMENTS 10,090,785 B2 * 10/2018 Schindhelm .............. H02P 7/04
10,597,073 B2 *  3/2020 Lee ..................... F16H 25/2204

* cited by examiner

| SEPARATOR SWITCHES(SW) | MOTOR 1 ON | MOTOR 2 ON | MOTOR 3 ON |
|---|---|---|---|
| SW7 | On | Off | Off |
| SW8 | On | Off | Off |
| SW9 | Off | On | Off |
| SW10 | Off | On | Off |
| SW11 | Off | Off | On |
| SW12 | Off | Off | On |
| SW13 | Off | Off | On |

Figure 3

STEER BY WIRE SYSTEM FOR OPERATING STEERING WHEEL AND STEERING COLUMN

This application claims priority under 35 U.S.C. § 119 to application no. IN 2022 4103 1009, filed on May 31, 2022 in India, the disclosure of which is incorporated herein by reference in its entirety.

The present disclosure relates to a steer by wire system for operating a steering wheel and steering column using shared hardware.

BACKGROUND

Steer-by-Wire systems opens up a new era in automotive technology. A steer-by-wire system aims to eliminate the physical connection between the steering wheel and the wheels of a car by using electrically controlled motors to change the direction of the wheels and to provide feedback to the driver. Steerby-wire systems have the advantages of improved vehicle driving performance, vehicle maneuverability, and the feasibility of innovative packaging and design. Steer-by-Wire systems have two elements, steering wheel actuator mounted in the steering column inside or near to the driver cabin and steering rack actuator mounted on the rack to control the movement of front wheels. The steering wheel actuator senses the driver's input on the steering wheel and provide it back to the rack actuator and vice versa. The steering wheel actuator also have functionalities known as steering column adjustment. Steering column adjustment is used to electrically adjust the position of the steering column as per the driver's comfort.

The steering column adjustment includes a tilt and telescopic movement of the steering column. The tilt movement of the steering column is driven by a radial motor controlled by a H bridge and the telescopic movement of the steering column is driven by an axial motor controlled by another H bridge. Both the radial and axial motors are brushed DC motors. The steering wheel actuator drives the steering wheel by way of a steering wheel motor, which is a six-phase brushless DC motor. The steering wheel actuator and steering column adjustments are packed in a single unit. This increases the overall size of the steering wheel actuation unit. Hence there occurs a need to reduce size by multiplexing power electronics for other functions so that overall number of power electronic components and driver stages can be reduced, which in turn bring down overall size and cost.

The patent application DE102017217581 A1 titled "Method For Operating A Steer-By-Wire Steering Apparatus And Steer-By-Wire Steering Device" discloses a method for operating a steer-by-wire steering apparatus comprising at least one steering setting element, at least one actuator for adjusting the steering actuator element in an axial direction and at least one rotor position sensor which is formed relative to a sensor with a rotor position of the servo motor correlated rotor position signal characterized in that an absolute position of the steering actuator element in the axial direction in at least one operating state on the basis of the rotor position signal. The overall size of the steering wheel actuation unit is large thereby increasing the space of steering column.

BRIEF DESCRIPTION OF THE DRAWINGS

An embodiment of the disclosure is described with reference to the following accompanying drawings:

FIG. 3 depicts a table (300) showing switching states of separator 30 switches for connecting each motor and isolating other motor.

DETAILED DESCRIPTION

The present disclosure is further described below in combination with the accompanying drawings. The following embodiments are merely used for more clearly describing the technical solutions of the present disclosure but are not intended to limit the scope of protection of the present disclosure.

Prior to the detailed description of the disclosure, it is important to understand some aspects of the disclosure. A switch is basically an electronic switch, which is a binary electronic device that can activate an electrical circuit. A network of switches is a layout of connected switches which function together to drive an electrical device. A H bridge is a network of switches that looks like the letter H. A H-bridge is used to drive a load, such as a brushed DC motor, in both directions and it controls the flow of current to a load. Separator switches are binary electronic switches that can switch an electrical circuit thereby separating another electrical circuit and vice versa. A driver is a component used to control another circuit or component, such as a high-power transistor, stepper motors, and numerous others. Each of the switches in the present embodiment are controlled by drivers, the drivers being in central communication with a microprocessor.

Figure 1:
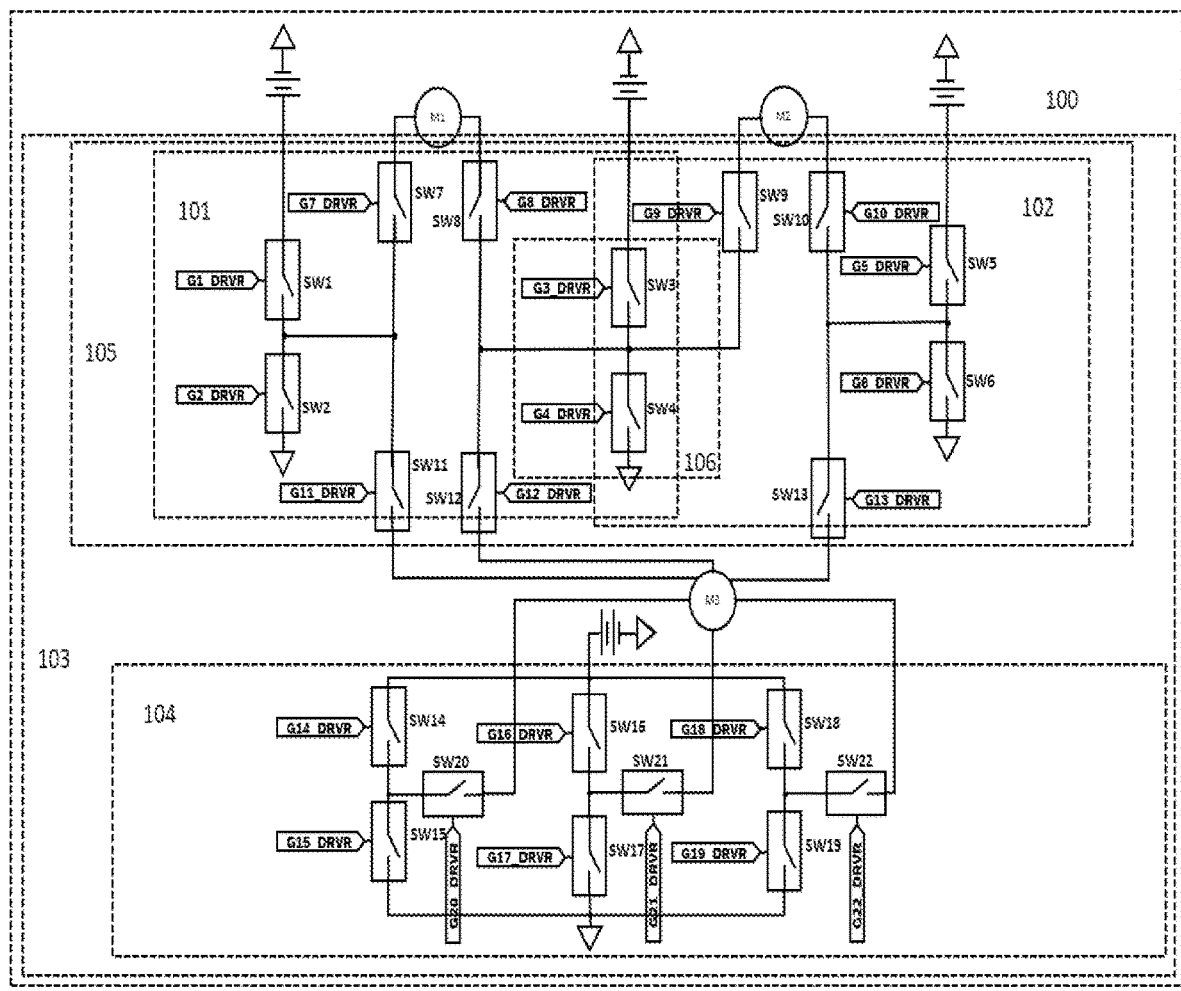
FIG. 1 depicts the hardware architecture of a steering wheel actuator 25 in a steer by wire system (100) for operating steering wheel and steering column.

FIG. 1 depicts the hardware architecture of a steering wheel actuator in a steer by wire system (100) for operating steering wheel and steering column. The hardware architecture (100) comprises a first DC brushed motor (M1) for operating the steering column in tilt direction, a second DC brushed motor (M2) for operating the steering column in telescopic direction and a brushless DC motor (M3) to operate the steering wheel. The hardware architecture (100) further comprises a network of switches and drivers powered by a battery source. The system is characterized by the first brushed DC motor (M1) and the second brushed DC motor (M2), that are configured to operate via separate H bridges having a shared arm of switches (106). The brushless DC motor (M3) is configured to operate with two three-phase H bridges (103) of which one threephase H bridge (105) is the network of switches of the first brushed DC motor (M1) and second brushed DC motor (M2).

Figure 2:
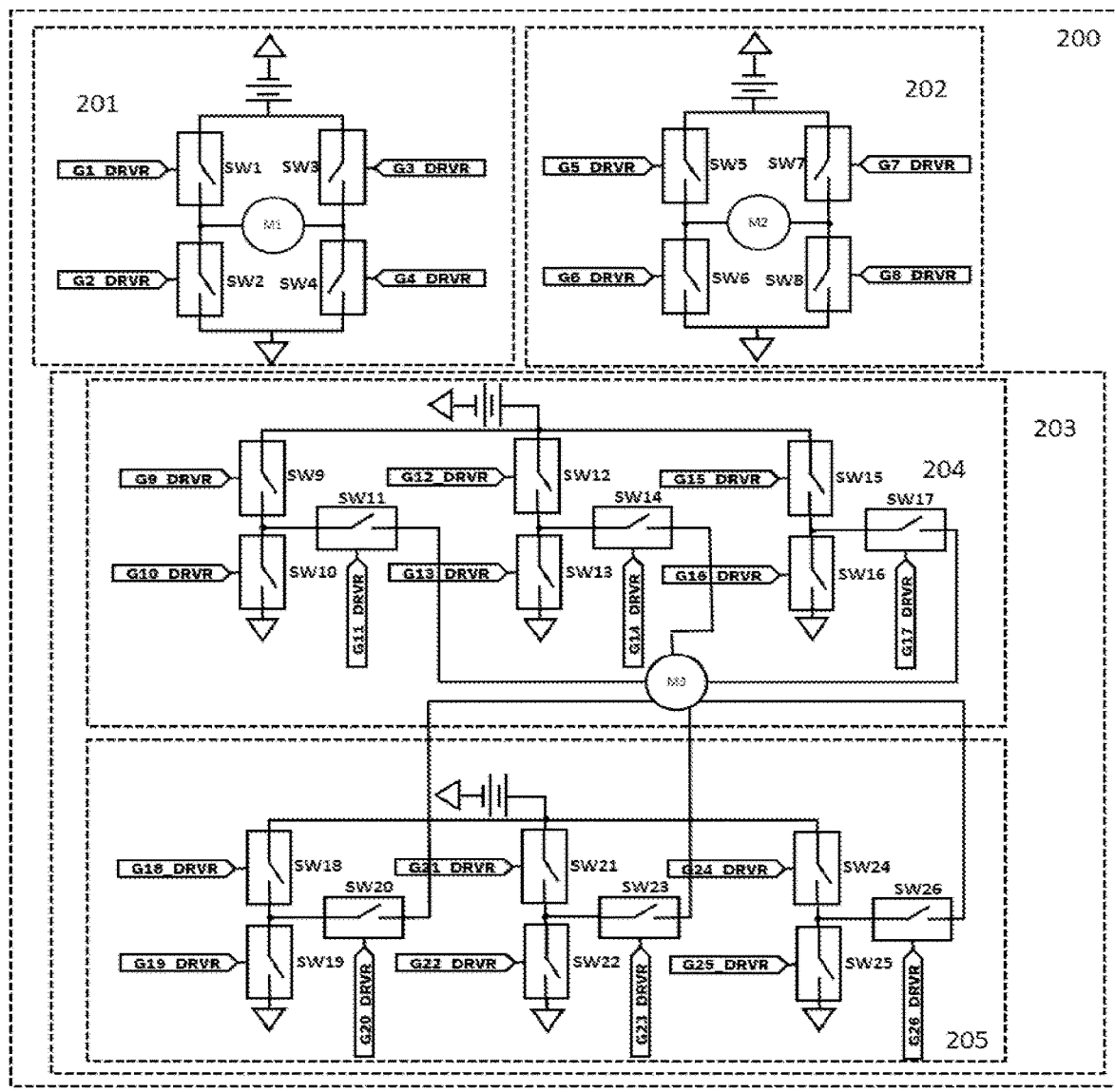
FIG. 2 depicts the conventional hardware architecture (200) of a steering wheel actuator in a steer by wire system for operating steering wheel and steering column.

A person skilled in the art would appreciate the existence of three dedicated network of switches for the operation of the first brushed DC motor (M1), second brushed DC motor (M2) and third brushless DC motor (M3) as in FIG. 2. FIG. 2 depicts the conventional hardware architecture (200) of a steering wheel actuator in a steer by wire system for operating steering wheel and steering column. The first brushed DC motor (M1) for tilt adjustment of the steering column commonly called the radial motor is configured to operate via a dedicated H bridge (201) formed by the switches SW1, SW2, SW3 and SW4. Similarly, the second brushed DC motor (M2) for telescopic adjustment of the steering column commonly called the axial motor is configured to operate via a second dedicated H bridge (202) formed by the switches SW5, SW6, SW7 and SW8. The brushless DC motor (M3)

for operating the steering wheel is configured to work via two three-phase H bridges (203), of which the load to motor M3 is been equally shared by both the three-phase H bridges (203) configured in the upper side and lower side of the motor M3. The upper threephase H bridge (204) is formed by the switches SW9, SW10, SW11, SW12, SW13, SW14, SW15, SW16 and SW17. The lower three-phase H bridge (205) is formed by the switches SW18, SW19, SW20, SW21, SW22, SW23, SW24, SW25 and SW26.

These dedicated separate H bridges in the conventional art increases the steering wheel actuator unit size. But the steering column is a confined area and has lot of space restrictions. Hence the present invention is focusing on techniques to reduce size by multiplexing power electronics so that overall number of power electronic components and driver stages can be reduced, which in turn bring down overall size and cost.

The hardware architecture (100) of the present disclosure is as described in FIG. 1 and is characterized by the first brushed DC motor (M1) and second brushed DC motor (M2) that are configured to operate via separate H bridges having a shared arm of switches (106). The brushless DC motor (M3) is configured to operate with two three-phase H bridges (103) of which one threephase H bridge (105) is the network of switches of the first brushed DC motor (M1) and second brushed DC motor (M2).

The network of switches as defined in the preceding paragraphs is the configuration of the switches as to operate the three motors. For instance, the first brushed DC motor (M1) for tilt adjustment of the steering column commonly called the radial motor is configured to operate via the network of switches SW1, SW2, SW3 and SW4 forming a first H bridge (101). Similarly, the brushed DC motor (M2) for telescopic adjustment of the steering column commonly called as the axial motor is configured to operate via the network of switches SW3, SW4, SW5 and SW6 forming a second H bridge (102). The arm of switches (106) SW3 and SW4 is shared between the first (101) and second (102) H bridges. This reduces the size of the tilt and telescopic adjustment unit of the steering wheel actuation unit as compared to the conventional art.

Each of the switches are controlled by drivers, which are in central communication with a microprocessor. The switch SW1 is controlled by the driver "G1_DRVR", where "DRVR" is the driver controlling the switch. Likewise, the switches SW2, SW3, SW4, . . . SWn are controlled by G2_DRVR, G3_DRVR, G4_DRVR . . . Gn_DRVR respectively.

The first brushed motor (M1) and second brushed motor (M2) are configured to operate in time division multiplexing. Time-division multiplexing is a method of transmitting and receiving independent signals over a common signal path by way of synchronized switches so that each signal appears on the line only a fraction of time in an alternating pattern. This means that both the brushed motors M1 and M2 cannot operate simultaneously. This is achieved by way of separator switches SW7, SW8, SW9 and SW10. When switches SW 7 and SW 8 are on with switches SW 9 and SW 10 being off, the first H bridge (101) is active thereby operating the first brushed motor (M1). Similarly, when the switches SW9 and SW10 are on with the switches SW7 and SW 8 being off, the second H bridge (102) will become active thereby operating the second brushed DC motor (M2).

A person skilled in the art would appreciate that the brushless DC motor (M3) can work either with two three-phase H bridges or one three-phase H bridge. When the brushless DC motor is operating with two three-phase H bridges (103), the load to the motor is been equally shared by both the threephase H bridges (103). When the brushless DC motor is operating with one threephase H bridge (104), the load to the motor is been fully driven by the lower three-phase H bridge (104). In one embodiment of the disclosure where the brushed DC motors M1 and M2 are not operational, the brushless DC motor (M3) operates with two three-phase H bridges (103) of which one three-phase H bridge (105) is the network of switches of the first brushed DC motor (M1) and second brushed DC motor (M2). The switches SW1, SW2, SW3, SW4, SW5 and SW6 forms the shared upper three-phase H bridge (105) and the switches SW14, SW15, SW16, SW17, SW18 and SW 18 forms the lower three-phase H bridge (104).

In the other embodiment of the disclosure, where either of the brushed DC motors is operative, the brushless DC motor (M3) operates with the lower three-phase H bridge (104), which is formed by the switches SW14, SW15, SW16, SW17, SW18, SW19, SW20, SW21 and SW22. The dual operating mode of the brushless dc motor (M3) is achieved by way of separator switches S11, S12 and S13. Separator switches are binary electronic switches that can switch an electrical circuit thereby separating another electrical circuit and vice versa.

FIG. 2 depicts a table (300) showing switching states of separator switches for connecting each motor and isolating other motor. When separator switches SW 7 and SW 8 are on with rest of the separator switches off, the switches SW1, SW2, SW3 and SW4 forms a H bridge (101) thereby operating the brushed DC motor (M1). When separator switches SW9 and SW10 are on with rest of separator switches off, the switches SW3, SW4, SW5 and SW6 forms a second H bridge (102) thereby operating the brushed DC motor (M2). As the arm of switches (106) SW3 and SW4 are shared by both the brushed motors, only one brushed motor can function at a time. When either of the brushed motor is in working condition, the separator switches SW11, SW12 and SW 13 are off, thereby operating the brushless DC motor in one three-phase H bridge (104) formed by the switches SW14, SW15, SW16, SW17, SW18 and SW 18. When both the brushed motors are not operative, the switches SW11, SW12 and SW 13 are on thereby operating the brushless DC motor in two three-phase H bridge (103). The three-phase H bridge (105) formed when the switches SW11, SW12 and SW13 are on is formed by the switches SW1, SW2, SW3, SW4, SW5 and SW 6.

In the embodiment of the disclosure where the brushless DC motor (M3) operates with two three-phase H bridges (103), the load is shared equally by both the three-phase H bridges (103). In the other embodiment of the disclosure where the brushless DC motor (M3) operates with one three-phase H bridges (104), the load to the motor is been fully driven by the lower three-phase H bridge (104).

This idea of embodying a shared hardware and time division multiplexing for a steering wheel actuation unit eliminates the problem of the conventional art wherein the size of the steering wheel actuation unit is very large thereby increasing the size of the steering column. The present disclosure eliminates this problem by embodying a shared hardware architecture (100) using time division multiplexing and thereby decreasing the cost of the steering wheel actuation unit.

It must be understood that the embodiments explained in the above detailed description are only illustrative and do not limit the scope of this disclosure. Any modification to a steer by wire system (100) for operating steering wheel and steering column are envisaged and form a part of this disclosure. The scope of this disclosure is limited only by the claims.

What is claimed is:

1. A steer by wire system for operating a steering wheel and a steering column, comprising at least one steering wheel actuator, wherein:

the steering wheel actuator is configured to actuate the steering wheel by way of a brushless DC motor, the steering wheel actuator is configured to adjust the steering column in a tilt direction by way of a first brushed DC motor and in a telescopic direction by way of a second brushed DC motor, the brushless DC motor, the first brushed DC motor, and the second brushed DC motor are configured to operate via a network of switches, the first brushed DC motor and the second brushed DC motor are configured to operate via two separate H bridges having a shared arm of switches, the brushless DC motor is configured to operate with two three-phase H bridges, of which one three-phase H bridge is the network of switches of the first brushed DC motor and the second brushed DC motor, when both of the first brushed DC motor and the second brushed DC motor are in a non-operative state.

2. The steer by wire system as claimed in claim 1, wherein the first brushed DC motor and the second brushed DC motor are configured to operate by time division multiplexing.

3. A steer by wire system for operating a steering wheel and a steering column, comprising at least one steering wheel actuator, wherein:

the steering wheel actuator is configured to actuate the steering wheel by way of a brushless DC motor, the steering wheel actuator is configured to adjust the steering column in a tilt direction by way of a first brushed DC motor and in a telescopic direction by way of a second brushed DC motor, the brushless DC motor, the first brushed DC motor, and the second brushed DC motor are configured to operate via a network of switches, the first brushed DC motor and the second brushed DC motor are configured to operate via two separate H bridges having a shared arm of switches, the brushless DC motor is configured to operate with two three-phase H bridges of which one three-phase H bridge is the network of switches of the first brushed DC motor and the second brushed DC motor, and the brushless DC motor is configured to operate with one three-phase H bridge when either of the first brushed DC motor or the second brushed DC motor is in an operative state.

4. The steer by wire system as claimed in claim 3, wherein the first brushed DC motor and the second brushed DC motor are configured to operate by time division multiplexing.

* * * * *